United States Patent
Ozawa

(10) Patent No.: US 10,735,602 B2
(45) Date of Patent: Aug. 4, 2020

(54) IMAGE FORMING APPARATUS

(71) Applicant: KONICA MINOLTA, INC., Tokyo (JP)

(72) Inventor: Fusako Ozawa, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/125,939

(22) Filed: Sep. 10, 2018

(65) Prior Publication Data

US 2019/0098142 A1 Mar. 28, 2019

(30) Foreign Application Priority Data

Sep. 22, 2017 (JP) .................................. 2017-182149

(51) Int. Cl.
*H04N 1/00* (2006.01)

(52) U.S. Cl.
CPC ....... *H04N 1/0009* (2013.01); *H04N 1/00037* (2013.01); *H04N 1/00092* (2013.01)

(58) Field of Classification Search
None
See application file for complete search history.

(56) References Cited

U.S. PATENT DOCUMENTS

| | | | |
|---|---|---|---|
| 2002/0051182 A1* | 5/2002 | Sommer | H04N 1/00408 358/1.15 |
| 2012/0236333 A1* | 9/2012 | Kiuchi | G03G 15/50 358/1.9 |
| 2016/0004939 A1* | 1/2016 | Inoue | G06K 15/1809 358/1.12 |

FOREIGN PATENT DOCUMENTS

| | | |
|---|---|---|
| JP | 2015121882 A | 7/2015 |
| JP | 2016011997 A | 1/2016 |

* cited by examiner

*Primary Examiner* — Frantz Bataille
(74) *Attorney, Agent, or Firm* — Buchanan Ingersoll & Rooney PC

(57) ABSTRACT

An image forming apparatus forms an image on a print medium, and the image forming apparatus includes: a storage that stores medium information including profile information corresponding to the print medium and attribute information of the print medium; and a medium detection sensor that detects attribute actual information of the print medium; wherein the medium information is configured such that the profile information corresponding to the print medium is associated with the attribute information of the print medium, and the attribute information or the print medium includes information detectable by the medium detection sensor.

11 Claims, 15 Drawing Sheets

IMAGE FORMING APPARATUS

The entire disclosure of Japanese patent Application No. 2017-182149, filed on Sep. 22, 2017, is incorporated herein by reference in its entirely.

BACKGROUND

Technological Field

The present disclosure relates to an image forming apparatus.

Description of the Related art

Conventionally, a certain image forming apparatus such as a copier or a printer forms a high quality image on a print medium in accordance with image forming conditions or output modes set for each of jobs. In order to form a high quality image on various printing media, it is necessary to specifically set the type and size of the print medium, process adjustment, or the like as profile information corresponding to the print medium. To overcome this issue, there are techniques (refer to JP 2016-011997 A and JP 2015-121882 A, for example) that register profile information of a print medium beforehand in an image forming apparatus in accordance with various types of pant media, determines corresponding information from the registered profile information of the print medium via an operation display unit or on the basis of a detection result of the medium detection sensor without specific setting for each of jobs, so as to form a high quality image on the print medium.

The conventional technique as described in JP 2016-011997 A, however, merely identifies the type of the print medium on the basis of the detection result of the sheet type of the print medium, and thus, there is still a need to have a user to select a specific piece of profile information from among profile information of a plurality of printing media. This takes time and labor for the user and thus lowers productivity. On the other hand, a conventional technique as described in JP 2015-121882 A forms a determination image on a print medium and the determination image is measured to determine a specific information from the profile information of the plurality of print media. This not merely decreases the productivity but also leads to cost increase.

SUMMARY

The present disclosure is made in view of such a situation, and an object thereof is to enable selection of specific information from among profile information of a plurality of print media without lowering productivity or increasing the cost.

To achieve the abovementioned object, according to an aspect of the present invention, there is provided an image forming apparatus, reflecting one aspect of the present invention, that forms an image on a print medium, the image forming apparatus including: a storage that stores medium information including profile information corresponding to the print medium and attribute information of the print medium; and a medium detection sensor that detects attribute actual information of the print medium; wherein the medium information is configured such that the profile information corresponding to the print medium is associated with the attribute information of the print medium, and the attribute information of the print medium includes information detectable by the medium detection sensor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4 is a diagram illustrating an example of a sheet selling image of the operation display unit according to an embodiment of the present disclosure;

FIG. 5 is a diagram illustrating an example of a sheet profile confirmation screen after detection of a print medium according to an embodiment of the present disclosure;

FIG. 7 is a diagram illustrating an example of a registration completion screen at the time of new registration of a sheet profile according to an embodiment of the present disclosure;

DETAILED DESCRIPTION OF EMBODIMENTS

Hereinafter, one or more embodiments of the present invention will be described with reference to the drawings. However, the scope of the invention is not limited to the disclosed embodiments. As used in the description of embodiments of the present disclosure, the terms "comprising", "constituted with", "including", "containing", "having", "be equipped with", or some other synonyms or variations thereof are intended to cover a nonexclusive inclusion. For example, a process, method, article or apparatus that includes a list of elements is not necessarily limited to only those elements, but may include other elements not explicitly listed or inherent to such process, method, article or apparatus. Furthermore, unless explicitly stated, "or" refers to an inclusive or and not an exclusive sum. For example, "condition A or B" is satisfied in any case where A is present and B is not present, A is not present and B is present, and both A and B are present.

The present disclosure also relates to an apparatus for performing the processing described herein. The apparatus may be specially constructed for the required purposes or may be built on a general purpose computer selectively activated or reconfigured by a computer program stored in the computer.

Also, the algorithms described herein are not inherently related to any particular computer or other apparatus. Various general purpose systems may be used with programs written in accordance with the teachings herein, or, alternatively, it may prove more convenient to construct a more specialized apparatus to execute required operational steps. The structure required for these various systems will become apparent from the description below. Furthermore, the present disclosure is independent of any particular programming language. It will be appreciated that a variety of programming languages may be used to implement the teachings of the present disclosure as described herein.

Figure 1:
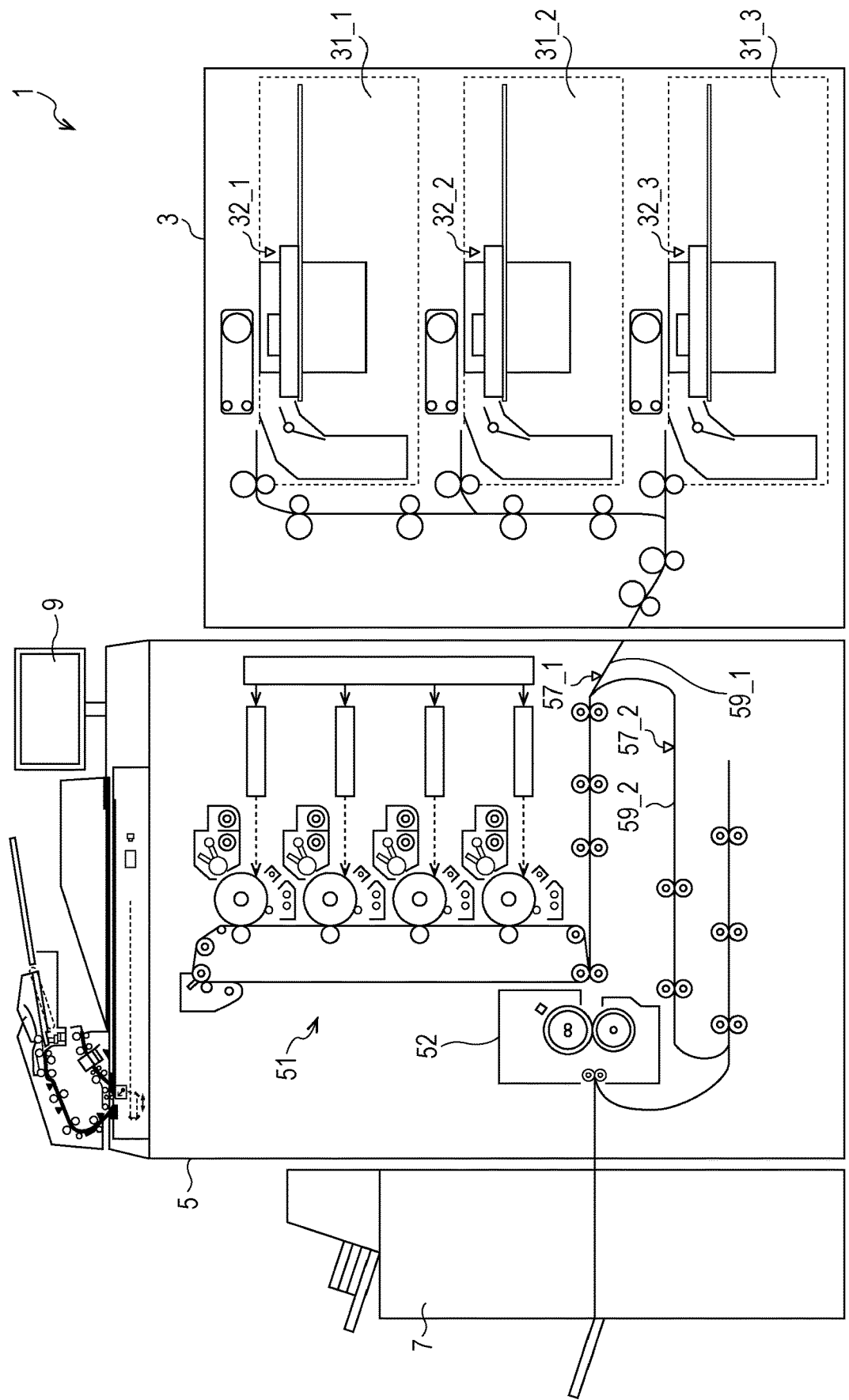
FIG. 1 is a diagram illustrating an example of an overall configuration of an image forming apparatus according to an embodiment of the present disclosure.

FIG. 1 is a diagram illustrating an example of an overall configuration of an image forming apparatus 1 according to an embodiment of the present disclosure. As illustrated in FIG. 1, the image forming apparatus 1 includes a sheet feeding apparatus 3, an image forming apparatus main body 5, and a post-processing apparatus 7. A communication port is provided between the sheet feeding apparatus 3 and the image forming apparatus main body 5, and a print medium is fed from the sheet feeding apparatus 3 to the image forming apparatus main body 5 via the communication port. Specifically, the sheet feeding apparatus 3 is disposed on an upstream side of the image forming apparatus 1 and includes trays 31_1 to 31_3 and medium detection sensors 32_1 to 32_3. The trays 31_1 to 31_3 will be referred to as the tray 31 unless any of these are particularly specified. The sheet feeding apparatus 3 accommodates print media for each of the trays 31 and separates and discharges the print medium one by one. The image forming apparatus main body 5 includes an image forming unit 51 and a fixing unit 52, and forms an image on a print medium by an electrophotographic process technology. Note that a scanner, an automatic document feeder, and an operation display unit 9 are provided above the image forming apparatus main body 5. The operation display unit 9 receives user's operation and displays operation content of the user or an internal state gait apparatus such as the sheet feeding apparatus 3, the image leaning apparatus main body 5, or the post-processing apparatus 7. The operation display unit 9 is constituted, with a liquid, crystal display with a touch screen, for example. The post-processing apparatus 7 performs post-processing on a print medium on which an image is formed, supplied from the image forming apparatus main body 5. An example of post-processing is sorting.

In the sheet feeding apparatus 3, the medium detection sensor 32_1 is provided in the tray 31_1, the medium detection sensor 32_2 is provided in the tray 31_2, and the medium detection sensor 32_3 is provided in the tray 31_3. Therefore, each of the medium detection sensors 32_1 to 32_3 can perform medium detection alter the print medium is so in each of the trays 31_1 to 31_3, respectively. Here, the medium detection is to detect attribute information of the print medium. The attribute information of the print medium is information that can be used, to uniquely identify the print medium without depending on the environment, such as sheet type, grammage, sheet color, stiffness, sheet thickness, and whiteness of the print medium, and includes detection item information detectable by the medium detection sensors 32_1 to 32_3, Note that each of the medium detection sensors 32_1 to 32_3 will be referred to as the medium detection sensor 32 unless any of these is particularly specified.

In the image forming apparatus main body 5, a medium detection sensor 57_1 is provided in a conveyance path 59_1, while a medium detection sensor 57_2 is provided in a conveyance path 59_2. Therefore, each of the medium detection sensors 57_1 and 57_2 can perform medium detection after the print medium is conveyed along the conveyance paths 59_1 and 59_2. Note that the conveyance paths 59_1 and 59_2 will also be collectively referred to as the conveyance path 59. Moreover, the medium detection sensors 57_1 and 57_2 will also be collectively referred to as the medium detection sensor 57.

The medium detection sensors 32 and 57 may be, anything as long as they can detect the attribute information of the print medium, and an example of this is an optical sensor. A result of detection by the medium detection sensors 32 and 57 can be confirmed by the operation display unit 9. The operation display unit 9 cash display profile information corresponding to the print medium in addition to the attribute information of the print medium. The profile information corresponding to the print medium is setting information for forming an image on the print medium in accordance with intention of the user, and includes the type of the print medium, the size of the print medium, the magnification difference between the front and back sides of the print medium, or a process adjustment value such as in secondary transfer output adjustment in the image forming unit 51 or a fixing speed adjustment in the fixing unit 52. In other words, the profile information corresponding to the print medium includes specifications of the print medium and process conditions. Furthermore, it is preferable that the profile information corresponding to the print medium is set for each of the trays 31. For example, when plain sheet is stored in the tray 31_1, coated sheet is stored in the tray 31_2, and envelopes are stored in the tray 31_3, profile information corresponding to each of the print media is set, enabling execution of appropriate image forming processing. While the above description is an example having the print media being plain sheet, coated sheet, or envelopes, it is not limited thereto, and the print medium may be a long sheet, for example.

Figure 2:
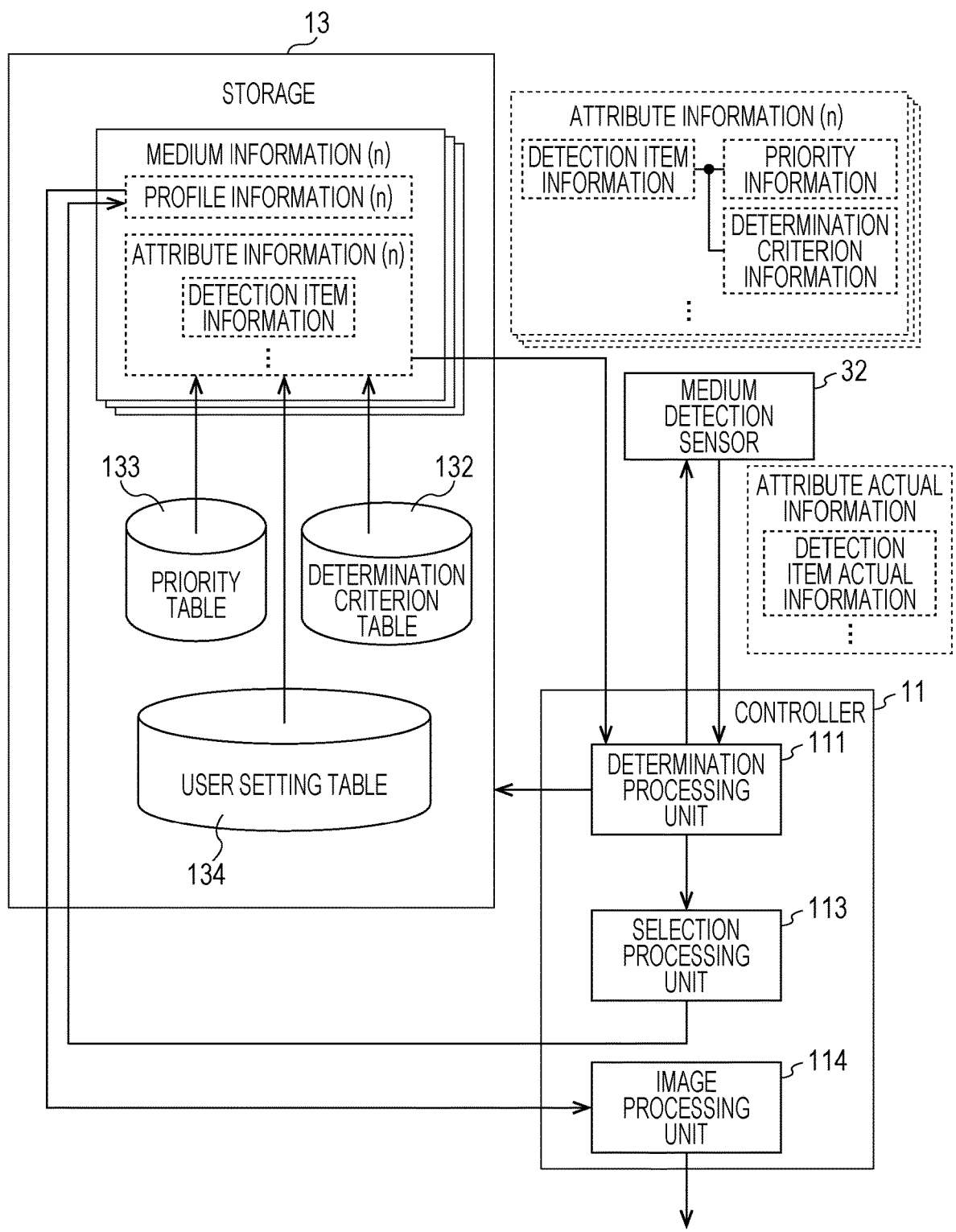
FIG. 2 is a diagram illustrating an example of data configuration of medium information according to an embodiment of the present disclosure.

FIG. 2 is a diagram illustrating an example of data configuration of medium information according to an embodiment of the present disclosure. The image forming apparatus 1 includes a controller 11 and a storage 13. The controller 11 mainly includes a CPU, a ROM, a RAM, and an I/O interface (not illustrated). The controller 11 causes the CPU to read various programs corresponding to the processing content from the ROM or the storage 13, develops the programs in the RAM, and cooperates with the various programs developed to control operation of individual portions of the image forming apparatus main body 5, while implementing various functions such as a determination processing unit 111, a selection processing unit 113, or an image processing unit 114. That is, the controller 11 functions as a processor that executes various types of processing.

The storage 13 is constituted with an HDD, for example, and stores various data for forming an high quality image on the print medium, such as medium information, a determination criterion table 132, a priority table 133, and a user setting table 134. The medium information includes profile information corresponding to the print medium and attribute information of the print medium, with the profile information corresponding to the print medium being associated with the attribute information of the print medium. The attribute information of the print medium includes at least one piece of detection item information. The detection item information is associated with each of the determination criterion table 132, the priority table 133, and the user setting table 134. The association between the profile information corresponding to the print medium and the attribute information of the print medium may be performed by, for example, setting the profile information corresponding to the print medium as profile information (n), setting the attribute information of the print medium as attribute information (a), in which those with the same number n are associated with each other. For example, the profile information (1) and the attribute information (1) may be associated with each other. In this case, the medium information (n) may be set as medium information (1).

The determination criterion table 132 sets determination criterion information as an index of an allowable range for determining whether the attribute information of the print medium stored in the storage 13 matches attribute actual information of the print medium detected by the medium detection sensor 32. For example, the determination criterion information is used to perform determination processing that, even when the attribute information of the print medium stored in the storage 13 does not completely match the attribute actual information of the print medium detected by the medium detection sensor 32, the attribute of the print medium stored in the storage 13 and the attribute actual information of the print medium detected by the medium detection sensor 32 are determined to match with each other provided that a difference between both information is within a certain allowable range. The determination criterion information is, for example, information set by the user via the operation display unit 9.

The attribute actual information of the print medium is information corresponding to the attribute information of the print medium stored in the storage 13, being information actually detected by the medium detection sensor 32. Accordingly, detection item actual information included in the attribute actual information of the print medium is also information corresponding to the detection item information included in the attribute information of the print medium stored in the storage 13, being information actually detected by the medium detection sensor 32. In a case where there is a plurality of pieces of detection item information, the priority table 133 sets priority information as an index of the priority for selecting at least one piece of detection item information. For example, the priority information may be set by the user via the operation display unit 9, The user setting table 134 sets user selling information. The user setting information is information set by the user via the operation display unit 9, being information to which priority is given over the determination criterion table 132 and the priority table 133.

In the case of forming an image on a print medium, the controller 11 selects profile information corresponding to the corresponding print medium from among the medium information stored in the storage 13 on the basis of the attribute actual information of the print medium detected by the medium detection sensor 32 and the attribute information of the print medium stored in the storage 13. Specifically, the determination processing unit 111 determines whether the attribute information of the print medium matches the attribute actual information of the print medium. The selection processing unit 113 selects the profile information included, in the medium information on the basis of a result of determination by the determination processing unit 111. The image processing unit 114 outputs a command to form an image on the print medium to the image forming unit 51 and the fixing unit 52 on the basis of a result of selection by the selection processing unit 113.

More specifically, in a case where the attribute information of the print medium matches the attribute actual information of the print medium, the controller 11 selects profile information corresponding to the print medium associated with the attribute information of the print medium that matches the attribute actual information of the print medium. When determining whether the attribute information of the print medium matches the attribute actual information of the print medium, the controller 11 determines which detection item information among the plurality of pieces of detection item information is used for matching determination by executing the following four types of processing appropriately. Alternatively, however, the four types of processing may be executed in any order or it is allowable to execute at least one of the four. In the case of first processing, when determining whether the attribute information of the print medium matches the attribute actual information of the print medium, the controller 11 selects at least one piece of detection item information from among the plurality of pieces of detection item information in accordance with priority information. In the case of second processing, when determining whether the attribute information of the print medium matches the attribute actual information of the print medium, the controller 11 determines whether a difference between the at least one piece of detection item information and the at least one piece of detection item actual information satisfies determination criterion information. In the case of third processing, when determining whether the attribute information of the print medium matches the attribute actual information of the print medium, the controller 11 selects at least one piece of detection item information from among the plurality of pieces of detection item information included in the attribute information of the print medium in accordance with user setting information. In the case of fourth processing, when selecting the profile information corresponding to the print medium, the controller 11 selects the medium information most recently stored into the storage 13.

In contrast, in a case where attribute information of the print medium does not match the attribute actual information of the print medium, the controller 11 stores new medium information defining attribute actual information of the print medium as attribute information of the print medium into the storage 13. In addition, in a case where the profile information corresponding to the print medium associated with the attribute information of the matched print medium is different from the user setting information even when the attribute actual information of the print medium matches the attribute information of the print medium, the controller 11 performs control to store crew medium information defining attribute actual information of the print medium as attribute information of the print medium into the storage 13. That is, in a case where the profile information corresponding to the print medium associated with the attribute information that matched attribute actual information of the print medium is different from the user setting information, the controller 11 performs control to store new medium information defining attribute actual information of the print medium as attribute information of the print medium into the storage 13. Note that when storing the new medium information defining the attribute actual information of the print medium as the attribute information of the print medium into the storage 13, the controller 11 controls to associate at least one piece of detection item information selected in accordance with the user setting information with the profile information corresponding to the print medium. As a premise of the above description, the determination by the controller 11 as to whether at least one piece of detection item information matches at least one piece of detection item actual information is executed when automatic detection of profile information is valid.

Figure 3:
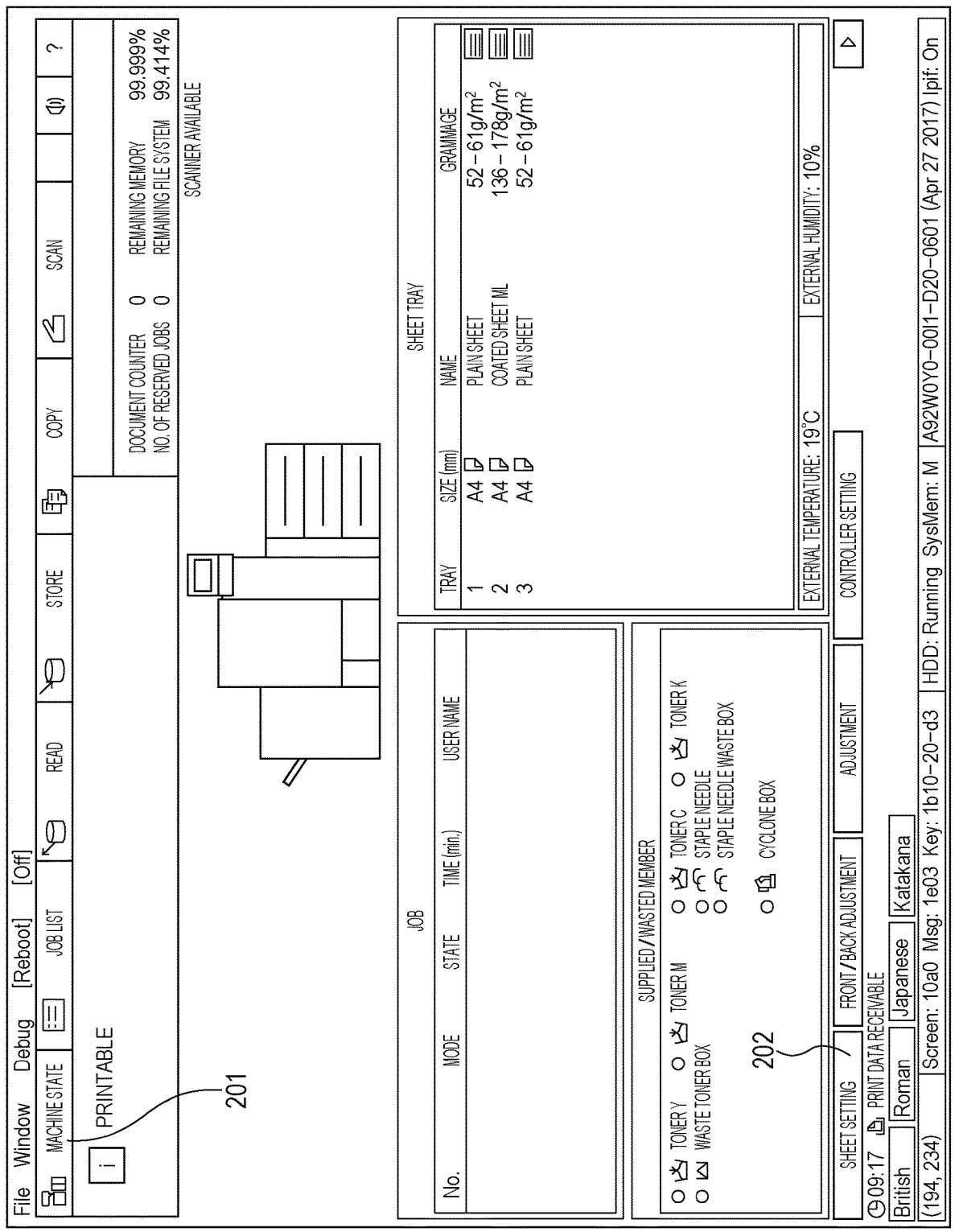
FIG. 3 is a diagram illustrating a basic screen example of an operation display unit according to an embodiment of the present disclosure.
Figure 4:
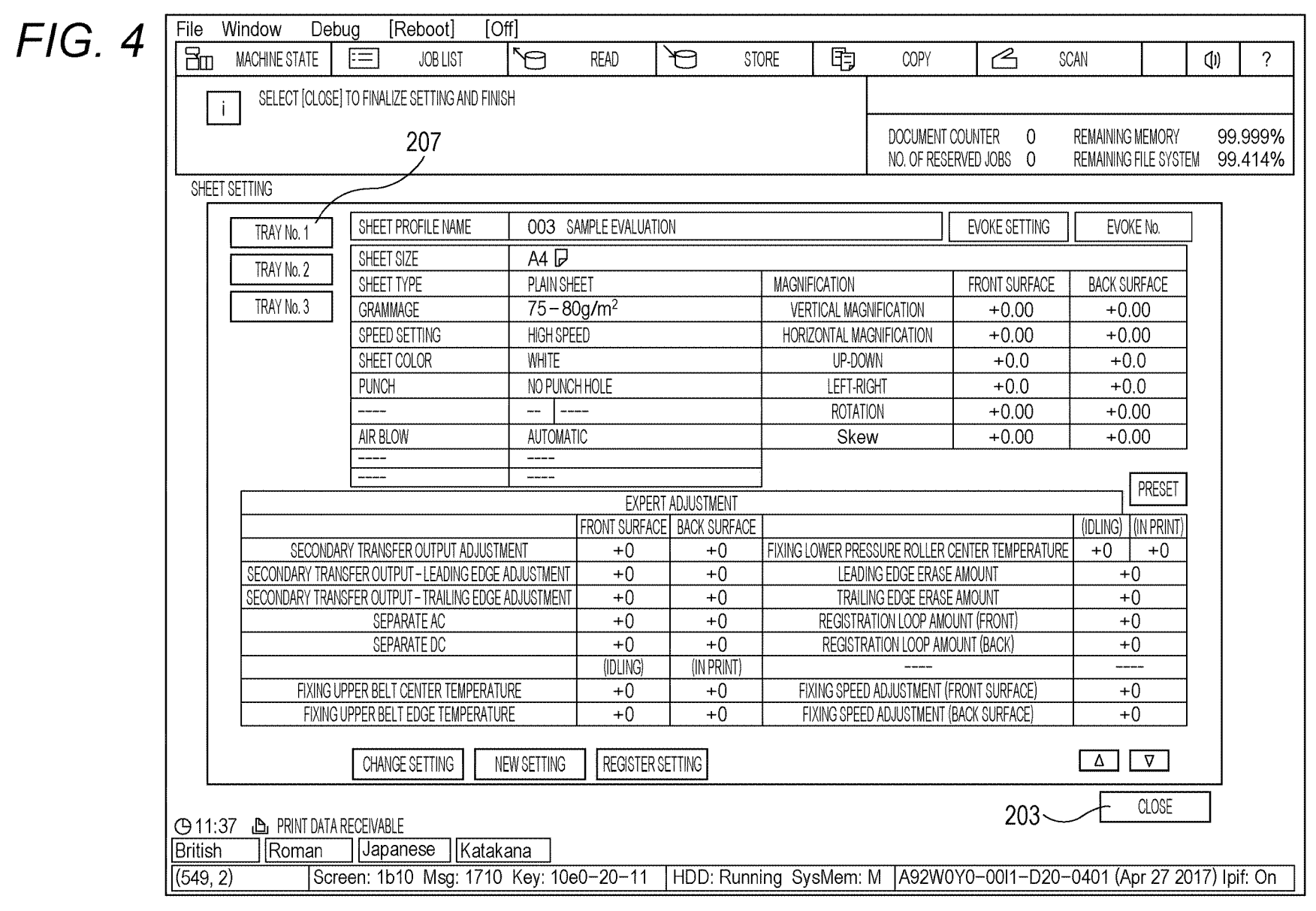

FIG. 3 is a diagram illustrating a basic screen example of an operation display unit 9 according to an embodiment of the present disclosure. FIG. 4 is a diagram illustrating an example of a sheet setting image of the operation display unit 9 according to an embodiment of the present disclosure. As illustrated in FIG. 3, when a button 201 related to the "machine state" is operated, information related to the machine state of the image forming apparatus 1 is displayed or becomes sellable. For example, when a button 202 related to "sheet setting" is operated, the screen transitions to a screen for setting profile information corresponding to the print medium as illustrated in FIG. 4. In FIG. 4, a button 207 related to "Tray No. 1" is operated, and profile information corresponding to a plain sheet stored in the tray 31_1 is displayed. In this case, a sheet profile name of the sheet profile corresponding to the profile information is "003 sample evaluation". Note that the example of FIG. 4 uses an interface in which sheet setting is finalized by operating a button 203 related to "close".

Figure 5:
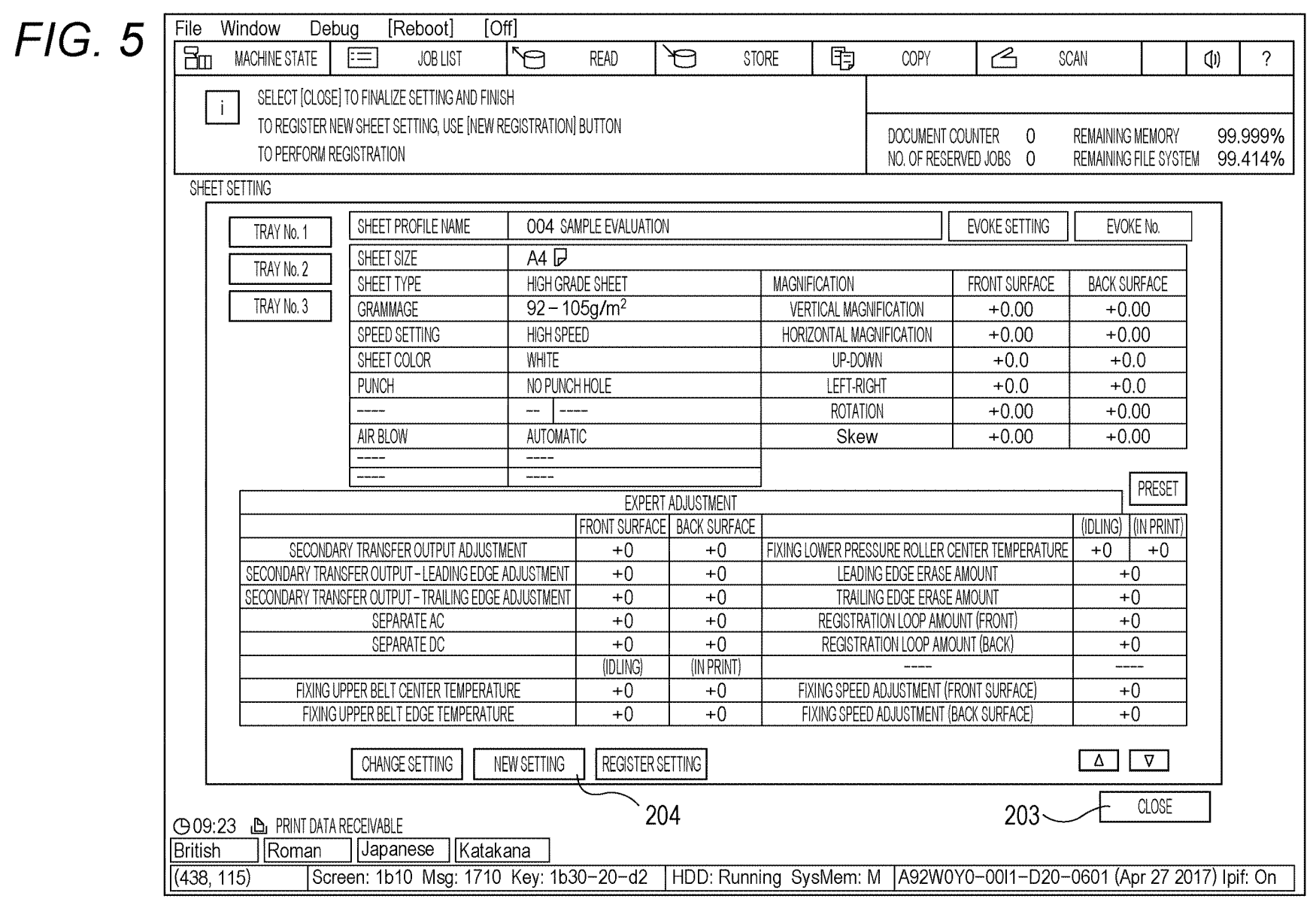

FIG. 5 is a diagram illustrating an example of a sheet profile confirmation screen after detection of a print medium according to an embodiment of the present disclosure. In a case where the automatic detection of the profile information corresponding to the print medium is valid, attribute information of the print medium matching the attribute actual information of the print medium detected in the medium detection by the medium detection sensor 32 is searched for. In a case where the attribute information of the print medium matching the attribute actual information of the print medium has been successfully detected, the profile information associated with the detected attribute information of the print medium is displayed as illustrated in FIG. 5. Here, operating on the button 203 related to "close" would finalize the profile information to be used in image forming on the print medium. In a case where the user wishes to register the setting as a separate sheet even when the attribute information of the print medium matching the attribute actual information of the print medium has been successfully detected, a button 204 related, to "new setting" may be operated as illustrated in FIG. 5.

Figure 6:
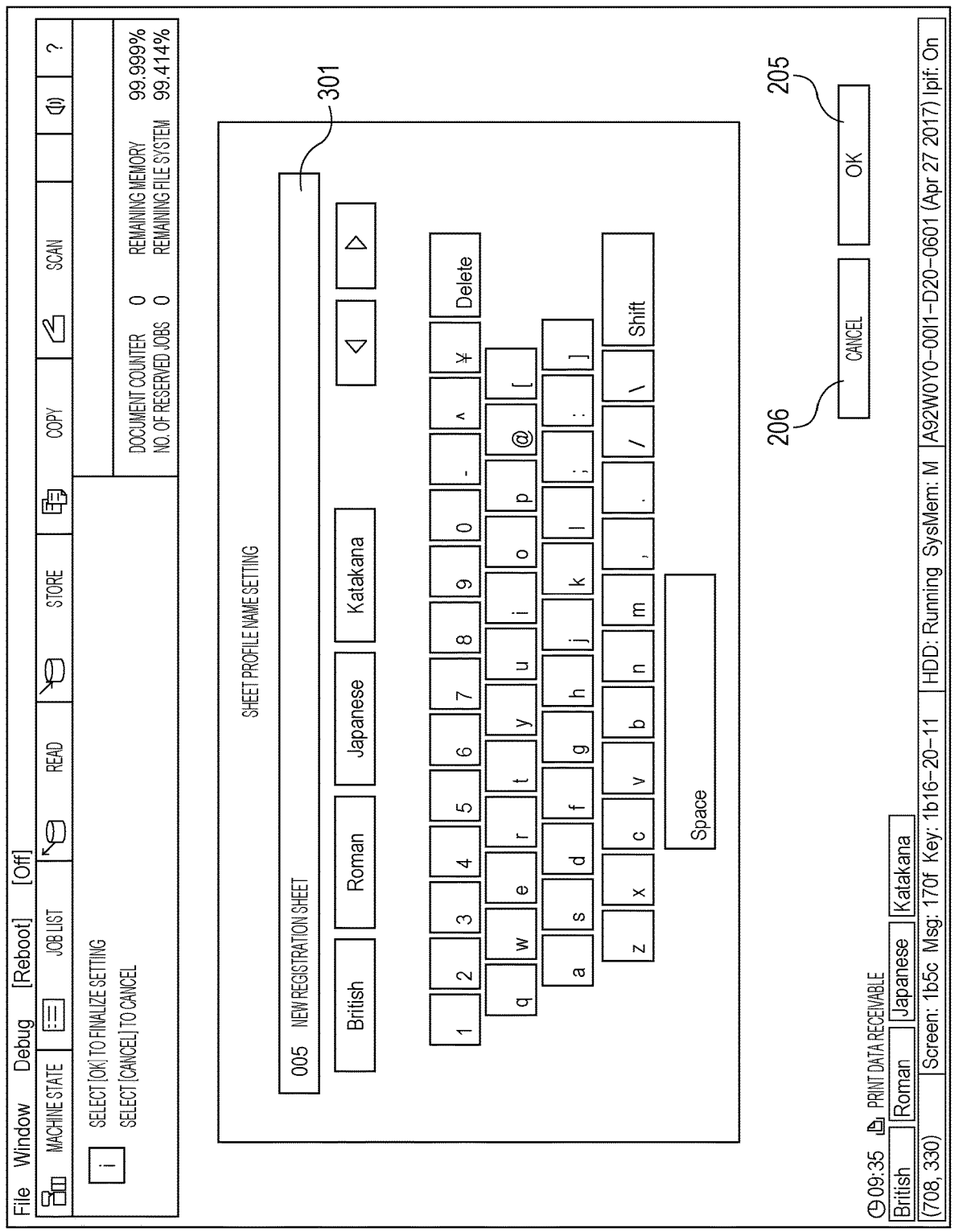
FIG. 6 is a diagram illustrating an example of a sheet profile name setting screen at the time of new registration of a sheet profile according to an embodiment of the present disclosure.
Figure 7:
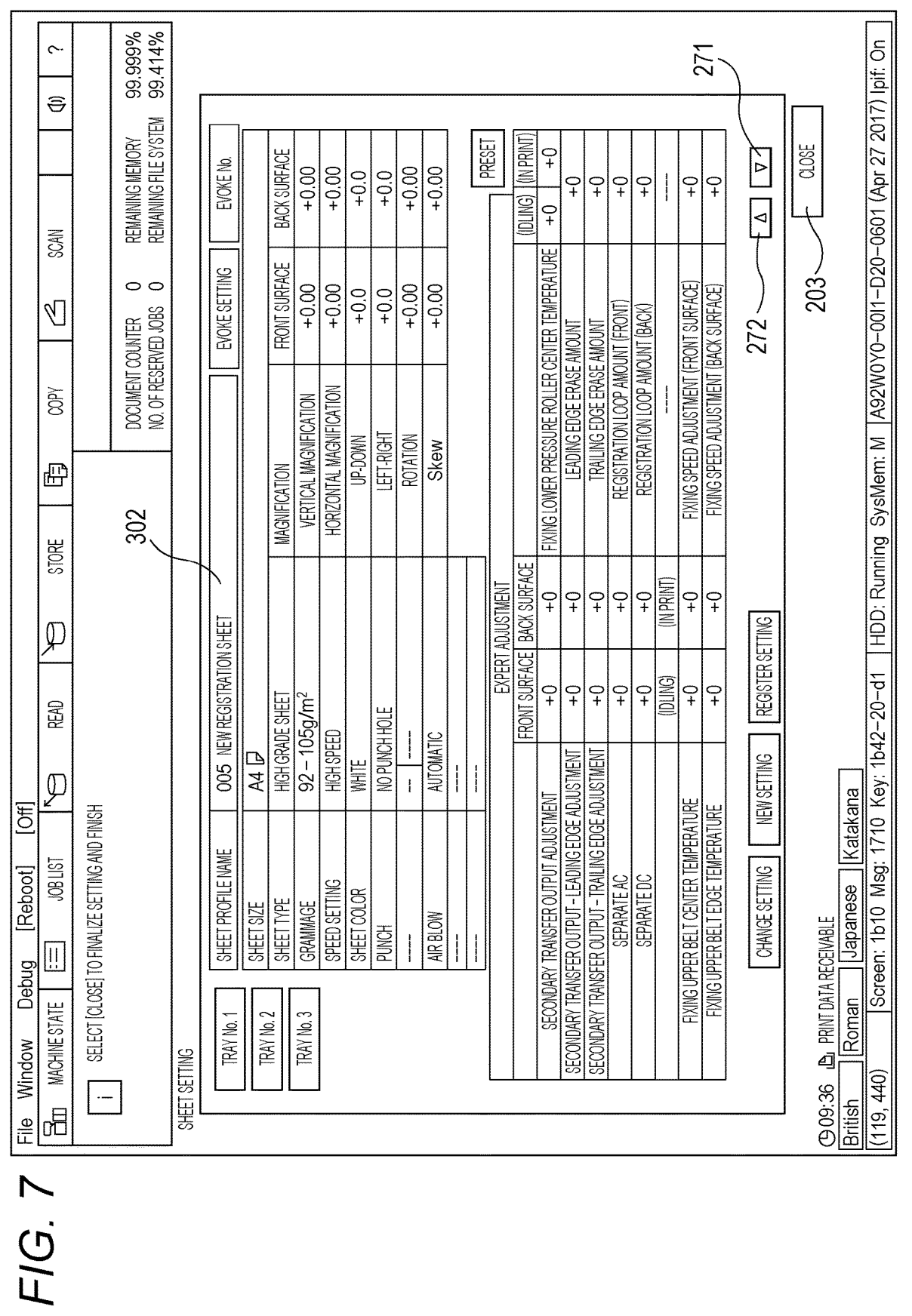

FIG. 6 is a diagram illustrating an example of a sheet profile name setting screen at the time of new registration of a sheet profile according to an embodiment of the present disclosure. FIG. 7 is a diagram illustrating an example of a registration completion screen at the time of new registration of a sheet profile according to an embodiment of the present disclosure. As illustrated in FIG. 6, a display space 301 displays reflected input content of the sheet profile name. For example, when the input is "005 new registration sheet" and a button 205 related to "OK" is operated, the screen transitions to the screen of FIG. 7 in which "005 new registration sheet" is displayed in a display space 302 of the sheet profile name as illustrated in FIG. 7. In contrast, when a button 206 related to "cancel" is operated in FIG. 6, the display content of the display space 301 is erased. Note that when the content illustrated in FIG. 7 is the most recently stored profile information, there is a possibility that it will be preferentially selected after execution of medium detection in the future. In a case where a plurality of pieces of profile information exists as candidates, it is possible to appropriately operate and display a button 272 related to a "triangle" or a button 271 related to an "inverted triangle". Furthermore, the profile information as illustrated in FIG. 7 may be manually input by a user, may be input by reading an electronic file, or may be input by reading encoded profile information such as a QR code (registered trademark) using a smartphone, or the like.

Figure 8:
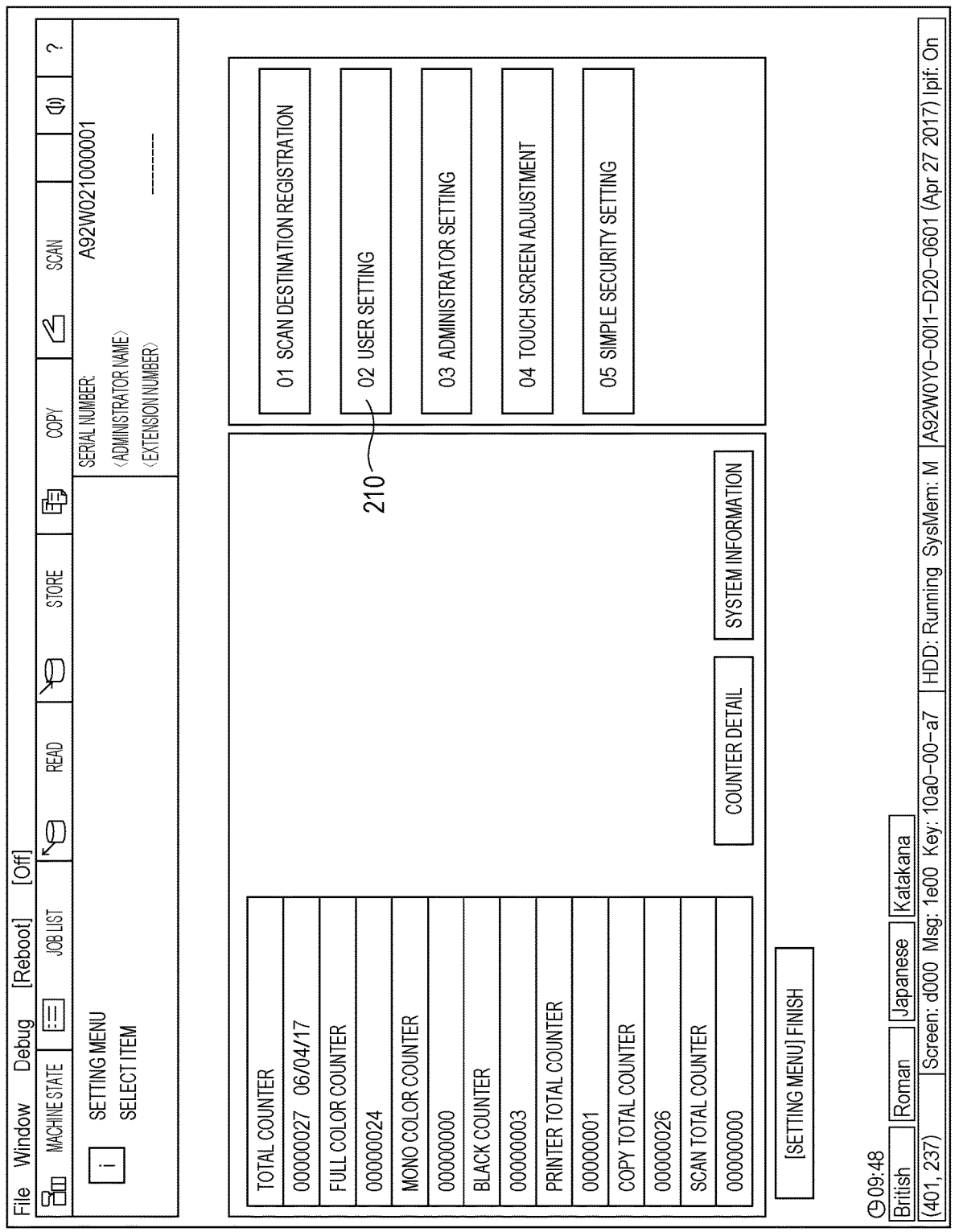
FIG. 8 is a diagram illustrating an example of a setting menu selection screen according to an embodiment of the present disclosure.
Figure 9:
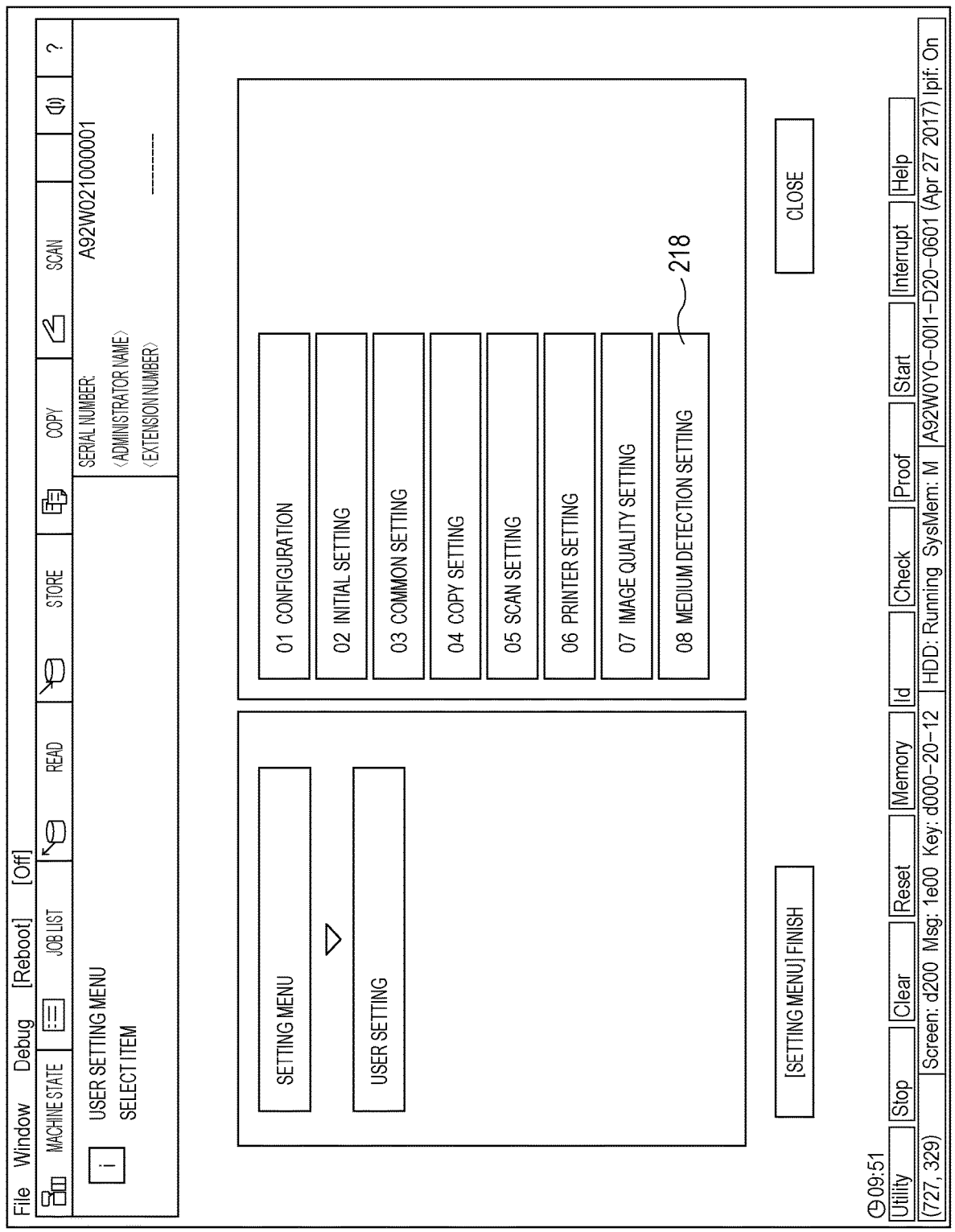
FIG. 9 is a diagram illustrating an example of a user setting menu selection screen according to an embodiment of the present disclosure.
Figure 10:
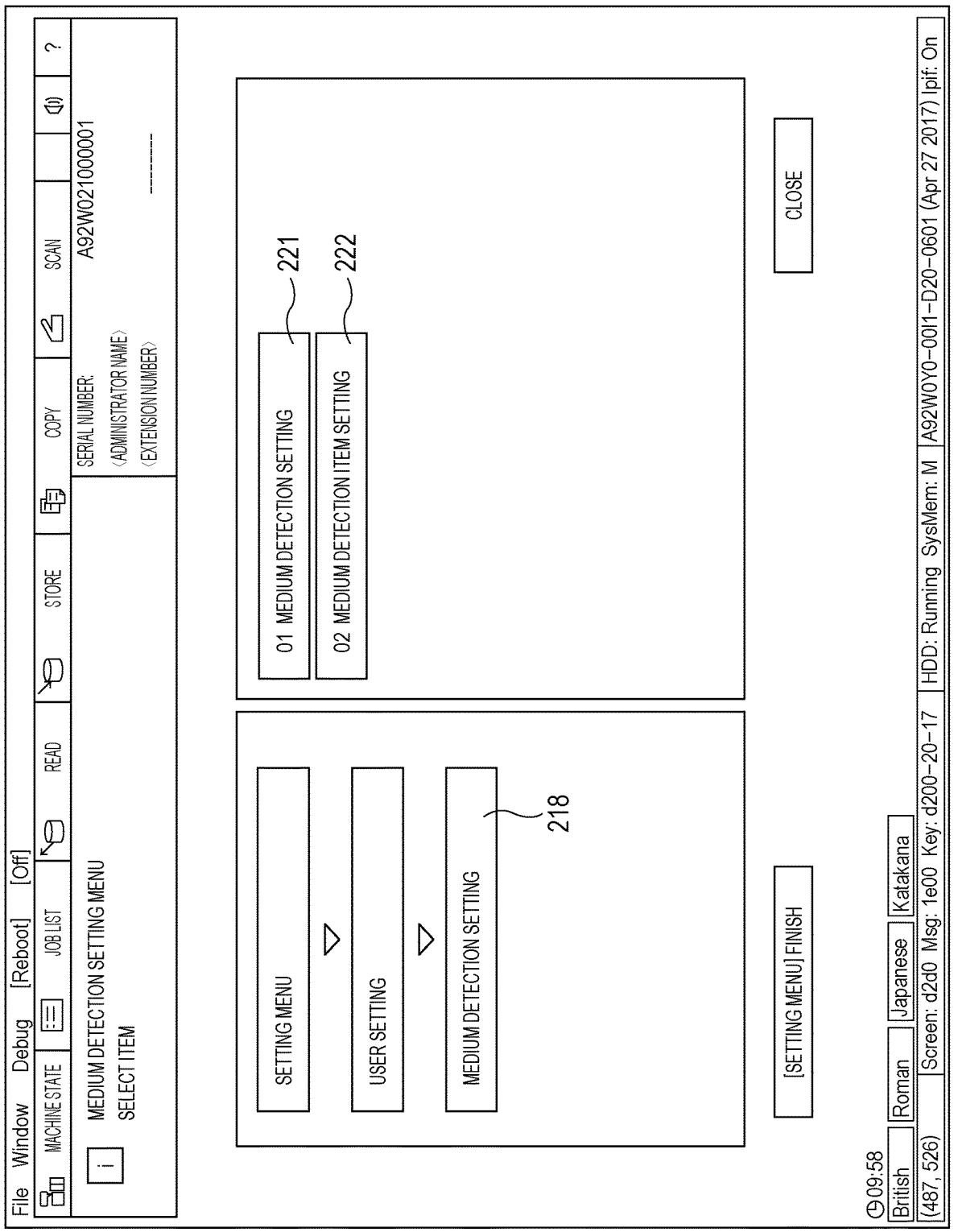
FIG. 10 is a diagram illustrating an example of a selection screen of a print medium detection setting according to an embodiment of the present disclosure.
Figure 11:
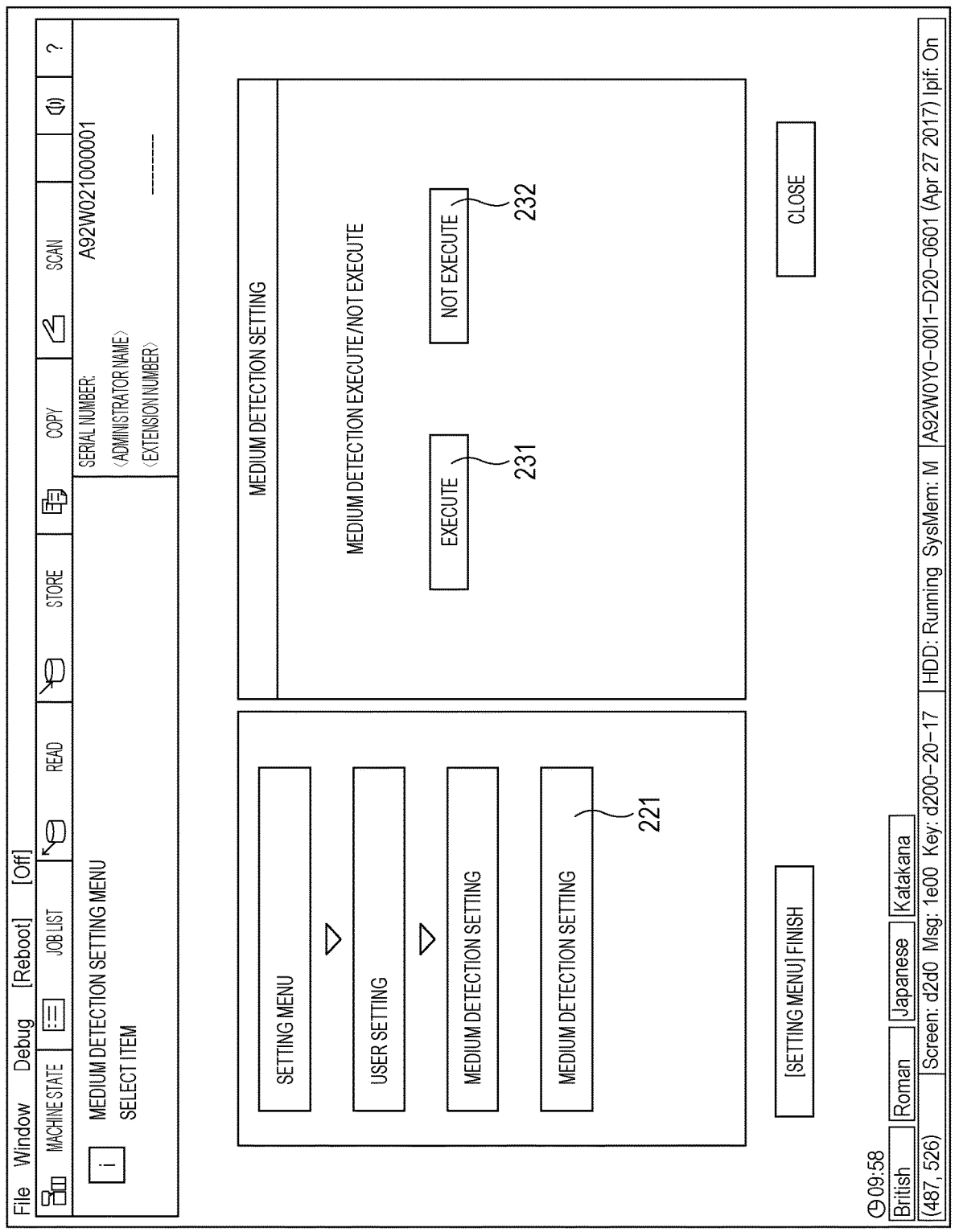
FIG. 11 is a diagram illustrating a setting screen example of a print medium detection setting according to an embodiment of the present disclosure.
Figure 12:
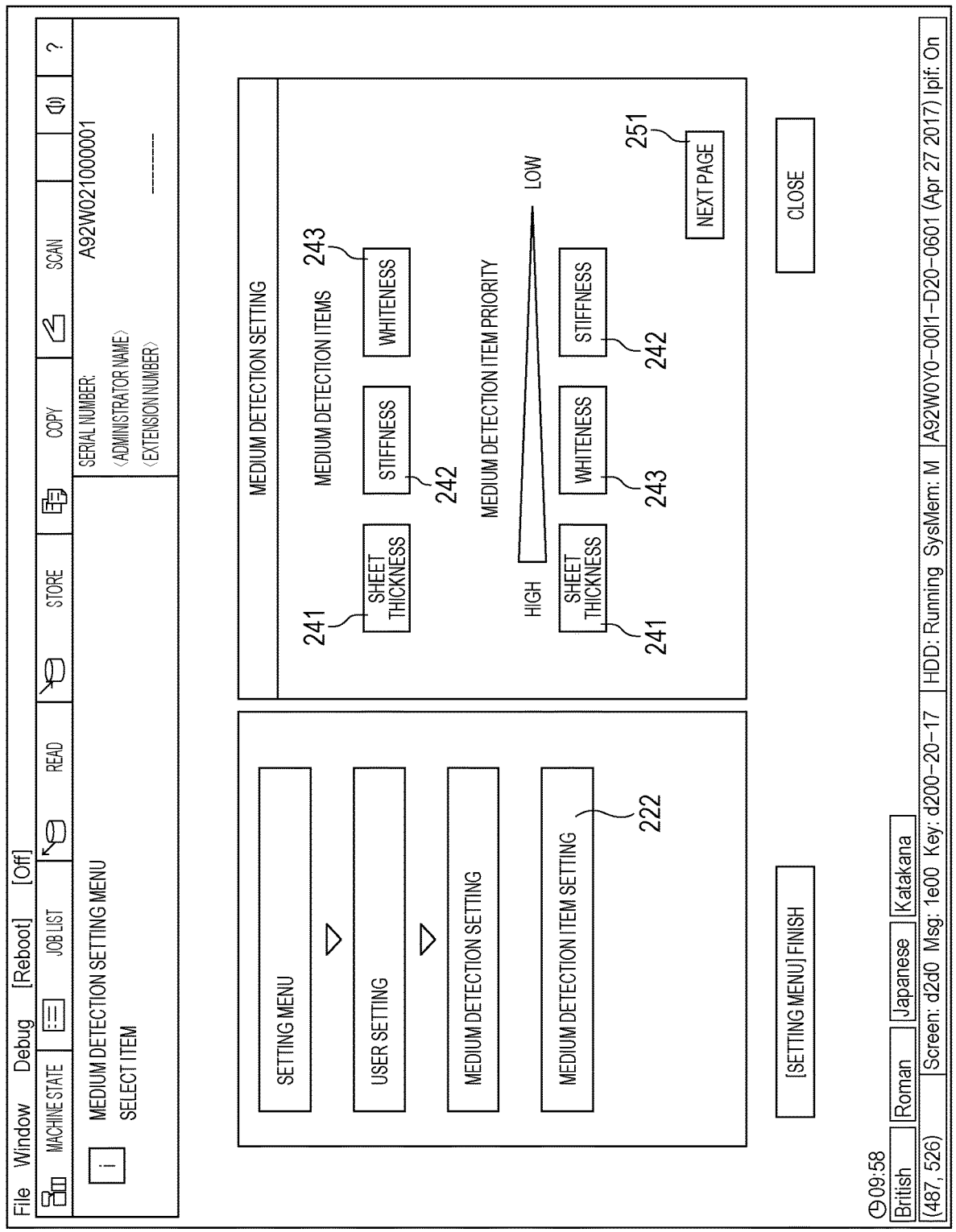
FIG. 12 is a diagram illustrating a selection screen example of print medium detection items according to an embodiment of the present disclosure.
Figure 13:
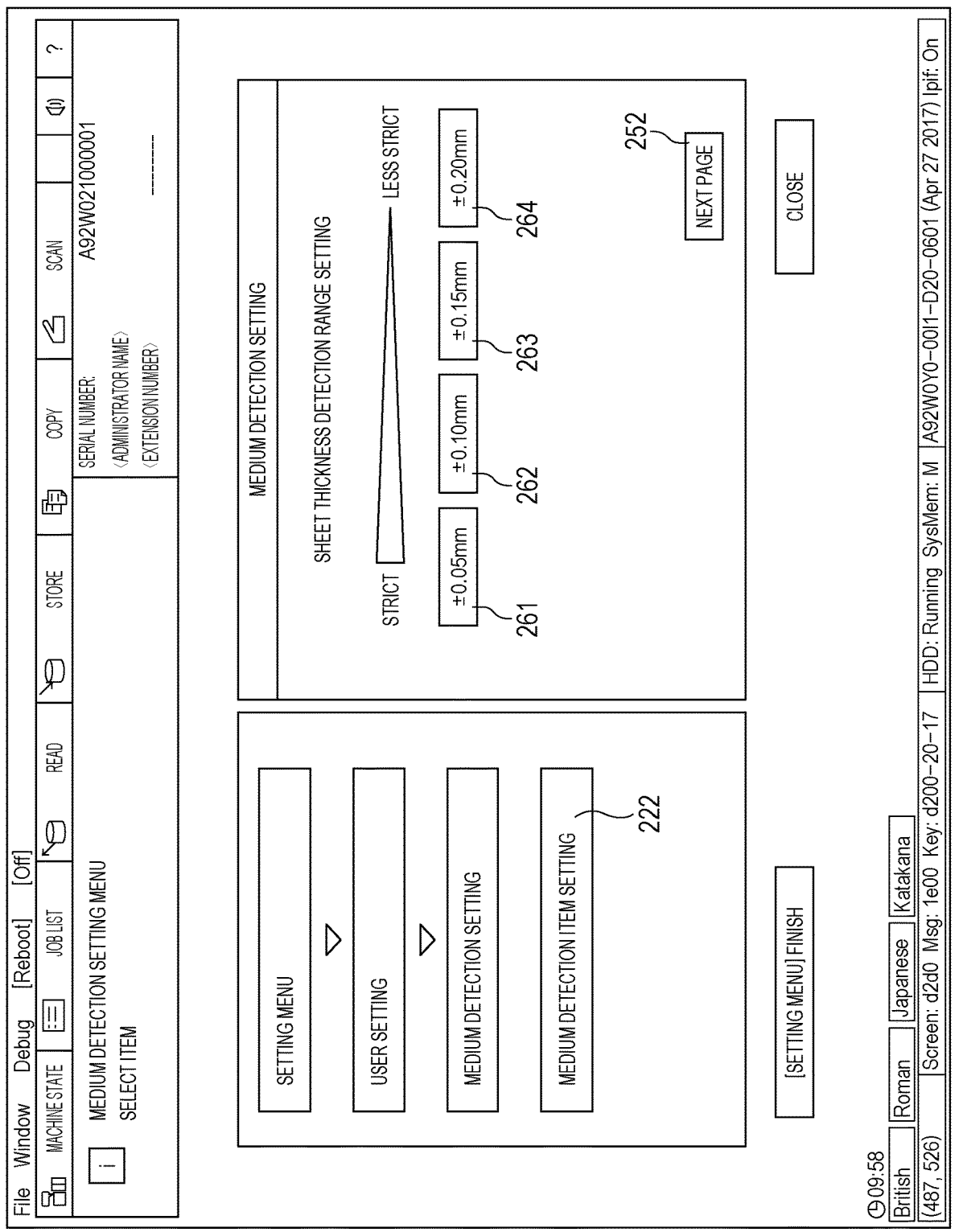
FIG. 13 is a diagram illustrating an example of a detection range setting screen of print medium detection items according to an embodiment of the present disclosure.

Medium detection by the medium detection sensor 32 can also be operated and set via the operation display unit 9. FIG. 8 is a diagram illustrating an example of a setting menu selection screen according to an embodiment of the present disclosure. FIG. 9 is a diagram illustrating an example of a user setting menu selection screen according to an embodiment of the present disclosure. FIG. 10 is a diagram illustrating a selection screen example of a print medium detection setting according to an embodiment of the present disclosure. FIG. 11 is a diagram illustrating a setting screen example of a print medium detection setting according to an embodiment of the present disclosure. FIG. 12 is a diagram illustrating a selection screen example of print medium detection items according to an embodiment of the present disclosure. FIG. 13 is a diagram illustrating an example of a detection range setting screen of print medium detection items according to an embodiment of the present disclosure.

With operation on a button 210 related to "02 user setting" in FIG. 8, the screen transitions to a screen illustrated in FIG. 9. With operation on a button 218 related to "08 medium detection setting" in FIG. 9, the screen transitions to a screen illustrated in FIG. 10. When a button 221 related to "01 medium detection setting" is operated in FIG. 10, the screen transitions to a screen illustrated in FIG. 11, and when a button 222 related to "02 medium detection item setting" is operated, the screen transitions to a screen illustrated in FIG. 12. When a button 231 related to "execute" is operated in FIG. 11, automatic detection of the profile information corresponding to the print medium is set to valid, and when a button 232 related to "not execute" is operated, automatic detection of the profile information corresponding to the print medium is set to invalid.

In the example of FIG. 12, detection item information is set with a display name of a medium detection item. For example, sheet thickness, stiffness, and whiteness are listed as detection item information via a button 241 related to "sheet thickness", a button 242 related to "stiffness" and a button 243 related to "whiteness". Priority information is also listed as settable information. For example, with operation on a button 251 related to "next page", the screen transitions to a screen illustrated in FIG. 13. In the example of FIG. 13, determination criterion information is listed as settable information. For example, a button 261 related to "±0.05 mm", a button 262 related to "±0.10 mm", a button 263 related to "±0.15 mm", and a button 264 related to "±0.20 mm" are listed to make information settable. A user can set the determination criterion information by operating any of the buttons 261 to 264. Note that with operation on a button 252 related to "next page" in FIG. 13, it is possible to transition to the screen for setting determination criterion information other than "sheet thickness".

Figure 14:
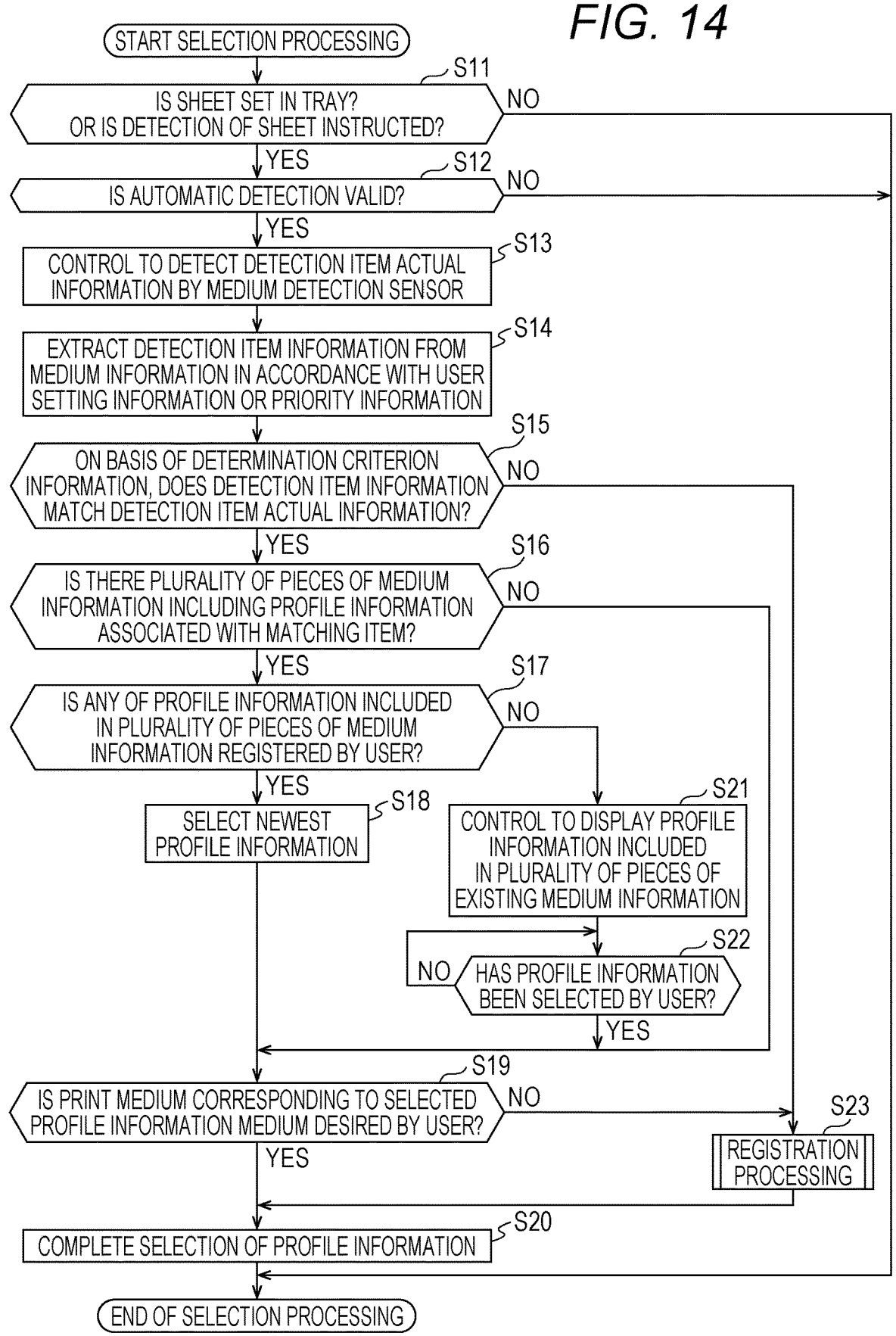
FIG. 14 is a flowchart illustrating sheet profile selection processing according to an embodiment of the present disclosure.
Figure 15:
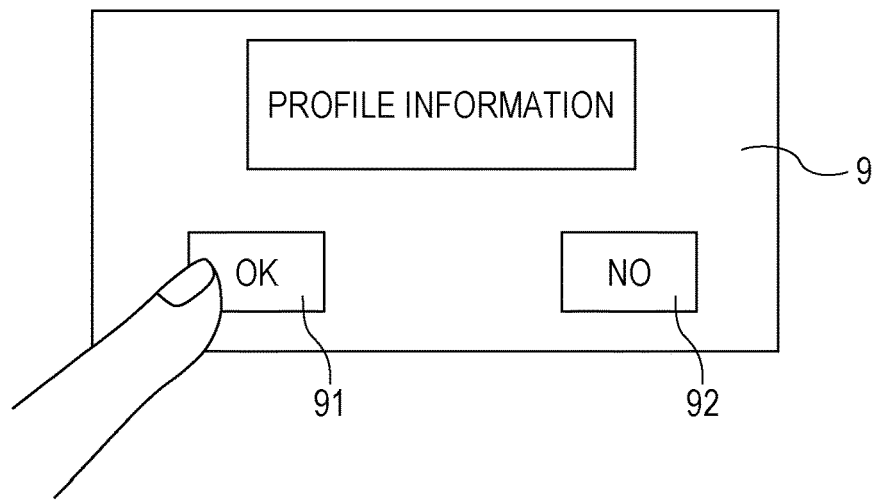
FIG. 15 is a diagram illustrating an example of a screen displayed in sheet profile selection processing according to an embodiment of the present disclosure.

FIG. 14 is a flowchart illustrating sheet profile selection processing according to an embodiment of the present disclosure. FIG. 15 is a diagram illustrating an example of a screen displayed in sheet profile selection processing according to an embodiment of the present disclosure. The selection processing of FIG. 14 is a combination of the processing of the determination processing unit 111 of FIG. 2 and the processing of the selection processing unit 113. Furthermore, the screen example illustrated in FIG. 15 is displayed at the time of processing of step S19 to be described below. In step S11, the controller 11 determines whether a sheet is set on the tray 31 or whether sheet detection is instructed. In a case where the controller 11 determines that the sheet is set on the tray 31 or sheet detection is instructed (step S11; Y), the controller 11 proceeds to processing of step S12. In a case where the controller 11 determines that the sheet is not set on the tray 31 or sheet detection is not instructed (step S11; N), the controller 11 finishes the selection processing. In step S12, the controller 11 determines whether automatic detection is valid. In a case where the controller 11 determines that automatic detection is valid (step S12, Y), the controller 11 proceeds to processing of step S13. In a case where the controller 11 determines that automatic detection is invalid (step S12; N), the controller 11 finishes the selection processing.

In step S13, the controller 11 causes the medium detection sensor 32 to detect detection item actual information. In step S14, the controller 11 extracts detection item information from the medium information in accordance with the user setting information or the priority information. In step S15, the controller 11 determines whether the detection item information matches the detection item actual information on the basis of the determination criterion information. In a case where the controller 11 determines that the detection item information matches the detection item actual information (step S15; Y) on the basis of the determination criterion information, the controller 11 proceeds to processing of step S16. In a case where the controller 11 determines that the detection item information does not match the detection item actual information (step S15; N) on the basis of the determination criterion information, the controller 11 proceeds to processing of step S23. In step S16, the controller 11 determines whether there is a plurality of pieces of medium information including profile information associated with the matching item. In a case where the controller 11 determines that there is a plurality of pieces of medium information including profile information associated with the matching item (step S16; Y), the controller 11 proceeds to processing of step S17. In a case where the controller 11 determines that there is not a plurality of pieces of medium information including profile information associated with the matching item (step S16; N), the controller 11 proceeds to processing of step S19.

In step S17, the controller 11 determines whether any of the profile information included in the plurality of pieces of medium information is registered by the user. In a case where the controller 11 determines that there is a profile information registered by the user among profile information included in the plurality of pieces of medium information (step S17; Y), the controller 11 proceeds to processing of step S18. Ina case where the controller 11 determines that there is not a profile information registered by the user among profile information included in the plurality of pieces of medium information (step S17; N), the controller 11 proceeds to processing of step S21. In step S18, the controller 11 selects the newest profile information, and proceeds to the processing of step S19. In step S19, it is determined whether the print medium corresponding to the selected profile information is a medium desired by the user. In a case where it is determined that the print medium corresponding to the selected profile information is a medium desired by the user (step S19; Y), the processing proceeds to processing of step S20. In a case where it is determined that the print medium corresponding to the selected profile information is not the one desired by the user (step S19; N), the processing proceeds to processing of step S23. That is, step S19 is processing of confirming whether the print medium desired by the user has been successfully detected. Specifically, as illustrated in FIG. 15, the selected profile information is presented or displayed in step S19 to the user to obtain user's confirmation whether the profile information is desired by the user. For example, when the profile information is desired by the user, the user selects a button 91 to transmit the selection to the controller 11, and the controller It proceeds to the processing of step S20. When the profile information is not the one desired by the user, the user selects a button 92 to transmit the determination to the controller 11, and the controller 11 proceeds to processing of step S23. In many cases, the profile information is displayed in step S19 because the profile information would allow the user to determine whether a desired print medium has been detected. Alternatively, however, it is allowable to configure to display medium information including the selected profile information or configure to be able to refer to attribute information associated with the selected profile information. Since the profile information or the medium information illustrated in FIG. 15 is as described above, detailed description thereof will be omitted.

In step S20, the controller it completes the selection of the profile information and finishes the selection processing. In step S21, the controller it controls to display the profile information included in the plurality of pieces of medium information, and proceeds to processing of step S22. In step S22, the controller 11 determines whether the profile information has been selected by the user. In a case where the controller 11 determines that the profile information has been selected by the user (step S22; Y), the controller 11 proceeds to the processing of step S19. In a case where the controller 11 determines that the profile information has not been selected by the user (step S22; N), the controller 11 repeatedly executes processing of step S22. In step S23, the controller it executes the registration processing and then proceeds to the processing of step S20. Registration processing will be described below with reference to FIG. 16.

Figure 16:
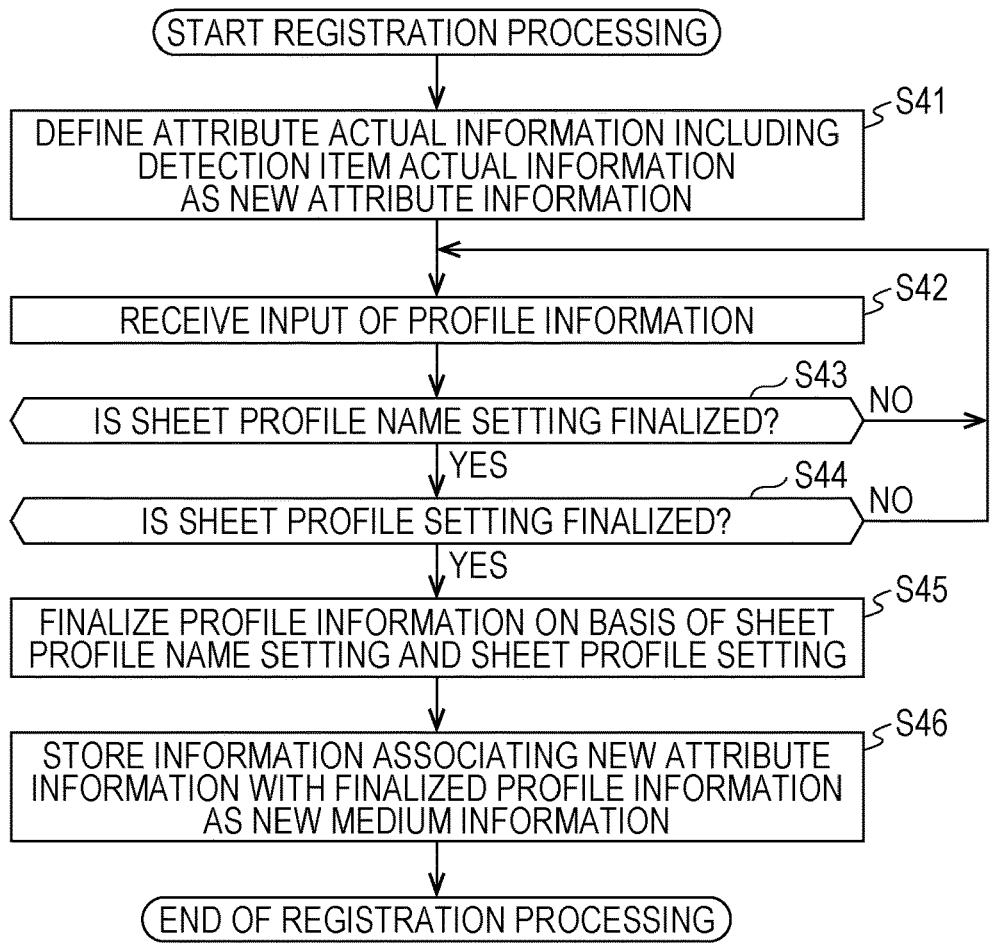
FIG. 16 is a flowchart illustrating sheet profile registration processing according to an embodiment of the present disclosure.

FIG. 16 is a flowchart illustrating sheet profile registration processing according to an embodiment of the present disclosure. In step S41, the controller 11 sets the attribute actual information including the detection item actual information as new attribute information, and proceeds to processing of step S42, In step S42, the controller 11 receives an input of the profile information and proceeds to the processing of step S43. In step S43, the controller 11 determines whether sheet profile name setting has been finalized. In a case where determining that the sheet profile name setting is finalized (Y in step S43), the controller 11 proceeds to processing in step S44. In a case where determining that the sheet profile name setting is not finalized (step S43; N), the controller 11 returns to the processing of step S42. In step S44, the controller It determines whether the sheet profile setting has been finalized. In a case where determining that the sheet profile setting has been finalized (Y in step S44), the controller 11 proceeds to processing in step S45. In a case where the controller 11 determines that the sheet profile setting is not finalized (step S44; N), the controller 11. returns to the processing of step S42. In step S45, the controller 11 finalizes the profile information on the basis of the sheet profile name and the sheet profile setting, and proceeds to step S46. In step S46, the controller it performs control to store information associating the new attribute information with the finalized profile information as new medium information, and finishes the registration processing.

From the above description, the profile information corresponding to the print medium and the attribute information of the print medium are associated with each other in the present embodiment. Therefore, it is possible to derive profile information stored in the storage 13 from the attribute actual information of the print medium detected by the medium detection sensor 32 and the attribute information of the print medium stored in the storage 13. Accordingly, it is possible to select a specific piece of information from the profile information of a plurality of print media without lowering, productivity or increasing the cost.

In a case where an image is formed o a print medium in the present embodiment, profile information corresponding to the corresponding print medium from among the medium information stored in the storage 13 is selected on the basis of the attribute actual information of the print medium detected by the medium detection sensor 32 and the attribute information of the print medium stored in the storage 13. Therefore, it is possible to derive the profile information corresponding to the print medium detected by the medium detection sensor 32 from the attribute actual information of the print medium detected by the medium detection sensor 32. Accordingly, itis possible to select a specific piece of information from the profile information of a plurality of print media without lowering productivity or increasing the cost.

Furthermore, in a case where there is attribute information of the print medium including detection item information matching the detection item actual information included in the attribute actual information of the print medium in the present embodiment, the medium information including the attribute information of the print medium is selected. That is, the presence of the attribute information of the print medium matching the attribute actual information of the print medium detected by the medium detection sensor 32 in the storage 13 is equivalent to the presence of the profile information corresponding to the print medium detected by the medium detection sensor 32. This enables the medium information existing in the storage 13 to be used as it is, productivity can be improved as a whole.

Furthermore, in a case where there is no attribute information of the print medium including detection item information matching the detection item actual information included in the attribute actual information of the print medium in the present embodiment, new medium information defining attribute actual information of the print medium as the attribute information of the print medium is stored into the storage 13. That is, the absence of the attribute information of the print medium matching the attribute actual information of the print medium detected by the medium detection sensor 32 in the storage 13 is equivalent to the absence of the profile information corresponding to the print medium detected by the medium detection sensor 32 in the storage 13. However, since new medium information is to be stored in the storage 13, the new medium information can be used in the next and subsequent times in the use of a similar print medium.

Furthermore, in the present embodiment, in a case where the print medium corresponding to the selected profile information is not the one desired by the user, new medium information defining the attribute actual information of the print medium as attribute information of the print medium is stored into the storage 13. Therefore, it is possible to store new medium information in the storage 13. Specifically, in a case where the user wishes to register as another medium information even when the attribute actual information of the print medium matches the attribute information of the mint medium, registering this in the storage 13 would enable registration as new medium information, making it possible to register profile information corresponding to the new print medium. For example, with operation on the button 204 related to "new setting" to set it as a new sheet as illustrated in FIG. 5, and with specific setting of the type of print medium, the size of print medium, process adjustment, or the like, as the profile information corresponding to a new print medium as illustrated in FIG. 7, it is possible to newly register the setting desired by the user.

Furthermore, in a case where there is a plurality of pieces of attribute information of the print medium including detection item information matching the detection item actual information included in the attribute actual information of the print medium in the present embodiment, the information most recently stored into the storage 13 is to selected. Therefore, even when there is a plurality of pieces of medium information in which the attribute actual information of the print medium matches the attribute information of the print medium, that is, even when there is a plurality of pieces of profile information corresponding to the printed medium associated with the attribute information of the print medium matching the attribute actual information of the print medium, the one most recently stored among the plurality of pieces of medium information is selected. Accordingly, it is possible to use the most recent one, making it possible to reflect the most recent profile information of the profile information stored in the storage 13 onto image formation.

Furthermore, at determination whether there is attribute information of the print medium including detection item information matching the detection item actual information included in the attribute information of the print medium in the present embodiment, the detection item information is selected by the user. This enables tire user to select which detection item information among the detection results of the medium detection sensor 32 is to be used, it is possible to reduce processing cost needed for determination processing compared with processing of determining all tire detection item actual information that can be detected by the medium detection sensor 32 and all the attribute information of pant medium stored in the storage 13.

Furthermore, in the present embodiment, when storing the new medium information defining the attribute actual information of the print medium as the attribute information of the pant medium into the storage 13, detection item actual information selected by the user and the profile information corresponding to the print medium are associated with each other. According, it is possible to form medium information including both attribute actual information including necessary detection item actual information alone and profile information associated with the attribute actual information, enabling user oriented customization of the medium information.

Furthermore, at determination whether there is attribute information of the print medium including detection item information matching the detection item actual information included in the attribute information of the print medium in the present embodiment, at least one piece of detection item information is selected in accordance with priority information. This makes it possible to execute the determination sequentially from the detection item information with the higher priority. Accordingly, it is possible to efficiently execute the determination processing of the attribute information of the print medium and the attribute actual information of the print medium. For example, in a case where there is no match in the detection item information of the first priority, the determination of matching of the other detection item information may be omitted, and matching determination of the detection item information of the second and subsequent priorities may be performed sequentially. As described above, it is possible to appropriately change part of the determination processing in accordance with the priority, enabling flexible operation of the image forming apparatus 1.

Furthermore, at determination whether there is attribute information of the print medium including detection item information matching the detection item actual information included in the attribute information of the print medium in the present embodiment, whether a difference between the detection item information and the detection item actual information satisfies the determination criterion information is determined. Therefore, it is determined whether a certain allowable range is satisfied, making it possible to change the precision of the matching determination by appropriately adjusting the determination criterion information. This makes it possible to set the determination criterion information to a strict level for a case where high matching precision is required, while setting the determination criterion information to a less strict level for a case where high matching precision is not required, enabling appropriate adjustment of the options of the profile information corresponding to the print medium according to the use situation.

Moreover, in a case where automatic detection of profile information corresponding to a print medium is valid in the present embodiment, whether the detection item information matches the detection item actual information is determined. Accordingly, setting the automatic detection by the medium detection sensor 32 would enable the user to execute the selection processing or the registration processing of the profile information corresponding to the print medium without special operation, making it possible to greatly reduce user's time and labor, and to enhance productivity of processing of forming an image on a print medium.

In the present embodiment, the profile information corresponding to the print medium is setting information for forming an image on the print medium. Therefore, it is possible to form an image on the print medium by setting suitable for the print medium.

Furthermore, the profile information corresponding to the print medium in the present embodiment includes specifications of the print medium and process conditions. Therefore, it is possible to form an image on the print medium by setting particularly suitable for the print medium.

While the image forming apparatus 1 according to one embodiment of the present disclosure has been described according to the embodiments above, the present disclosure is not limited thereto, and may be modified without departing from the scope and spirit of the present disclosure. For example, while one example in which the single sheet feeding apparatus 3 is arranged on the upstream side of the image forming apparatus main body 5 has been described, the present invention is not particularly limited to this. For example, a plurality of the sheet feeding apparatuses 3 may be arranged on the upstream side of the image forming apparatus main body 5. This makes it possible to increase the number of options of print media.

Furthermore, for example, while the above example is a case where the storage 13 is constituted with a HDD, it is not particularly limited thereto. For example, a semiconductor memory such as an optical disc, an IC card, an optical card, a mask ROM, an EPROM (Erasable Disc), an EEPROM (Electrically EPROM) may be used instead. This makes it possible to downsize the storage 13.

In addition, while the above is an example of the image forming apparatus 1 being provided with the controller 11 and the storage 13, the controller 11 and the storage 13 are only required to be included in the image forming apparatus 1. Accordingly, each of the controller 11 and the storage 13 may be included in any of the sheet feeding apparatus 3, the image forming apparatus main body 5, and the post-processing apparatus 7.

In addition, while processing based on the detection result of the medium detection sensor 32 has been described, it is not particularly limited thereto. For example, the processing may be based on the detection result of the medium detection sensor 57. In this case, the print medium may be conveyed along the conveyance path 59 to shift to the medium detection processing. Furthermore, the processing may be based on both the detection result of the medium detection sensor 32 and the detection result of the medium detection sensor 57. In this case, weighting may be set to the detection result of the medium detection sensor 32 and the detection result of the medium detection sensor 57, and which of the results and what extent are to be adopted may be appropriately changed. This also makes it possible to change the sensors to be used appropriately in accordance with the machine state of the image forming apparatus 1 in schedule managed printings, for example.

In addition, while the description is an example of processing of selecting the profile information most recently stored into the storage 13 at selection of profile information corresponding to the print medium, the present invention is not particularly limited to this. For example, it is allowable to use processing to select profile information with the highest usage frequency at selection of profile information corresponding to the print medium. With selection of profile information with the highest usage frequency as profile information corresponding to print medium, the print medium on which the image is formed becomes equivalent to output results obtained by other users. This makes it possible to estimate a finished state, and possible to avoid loss of time and resources due to the restart, or the like, caused by unintended finished state.

In addition, while the interface that selects the determination criterion information from a list has been described, it is not particularly limited thereto. For example, the user may set the allowable range by manual input.

The series of processing described above can be executed either by hardware or software. In a case where a series of processing is executed by software, programs constituting the software are installed on a computer capable of executing various functions by installation of various programs, from a recording medium that records the program, or, via the Internet, or the like.

Although embodiments of the present invention have been described and illustrated in detail, the disclosed embodiments are made for purposes of illustration and example only and not limitation. The scope of the present invention should be interpreted, by terms of the appended claims.

What is claimed is:

1. An image forming apparatus that forms an image on a print medium,
the image forming apparatus comprising:
a medium detection sensor that is configured to detect actual attribute information of print medium present in the image forming apparatus;
a storage that stores medium information including profile information corresponding to the print medium and attribute information of the print medium, wherein the profile information corresponding to the print medium is associated with the attribute information of the print medium and includes preselected setting information for setting image processing conditions for forming an image on a selected print medium, and the attribute information of the print medium includes information detectable by the medium detection sensor concerning physical qualities of the print medium; and
a hardware processor that, in a case where an image is formed on the print medium, selects profile information corresponding to the print medium from among the medium information stored in the storage on the basis of actual attribute information of the print medium present in the image forming apparatus detected by the medium detection sensor and the attribute information of the print medium stored in the storage,
wherein the attribute information of the print medium includes at least one piece of detection item information,
the actual attribute information of the print medium present in the image forming apparatus includes at least one piece of detection item actual information,
in a case where there is attribute information of the print medium including the detection item information matching the detection item actual information included in the actual attribute information of the print medium present in the image forming apparatus and previously detected by the medium detection sensor, the hardware processor selects the medium information including the attribute information of the print medium, and
in a case where there is no attribute information of the print medium including the detection item information matching the detection item actual information included in the actual attribute information of the print medium present in the image forming apparatus and previously detected by the medium detection sensor, the hardware processor performs control to store new medium information defining the actual attribute information of the print medium present in the image forming apparatus as attribute information of the print medium into the storage.

2. The image forming apparatus according to claim 1,
wherein the hardware processor controls to present selected profile information to a user to obtain confirmation, and
in a case where the print medium corresponding to the selected profile information is not the one desired by the user, the hardware processor performs control to store new medium information defining the actual attribute information of the print medium present in the image forming apparatus as attribute information of the print medium into the storage.

3. The image forming apparatus according to claim 1,
wherein, in a case where there is a plurality of pieces of attribute information of the print medium including the detection item information matching the detection item actual information included in the actual attribute information of the print medium present in the image forming apparatus, the hardware processor selects medium information including the attribute information of a print medium most recently stored into the storage.

4. The image forming apparatus according to claim 2,
wherein user setting information is set, and
when the hardware processor determines whether there is attribute information of the print medium including the detection item information matching the detection item actual information included in the actual attribute information of the print medium present in the image forming apparatus, the hardware processor selects at least one piece of detection item actual information from among a plurality of pieces of detection item actual information included in the actual attribute information of the print medium present in the image forming apparatus in accordance with the user setting information, and determines whether there is attribute information of the print medium including the detection item information matching the selected detection item actual information.

5. The image forming apparatus according to claim 4,
wherein in a case where the hardware processor stores the new medium information defining the actual attribute information of the print medium present in the image forming apparatus as the attribute information of the print medium into the storage, the hardware processor performs control to associate at least one piece of detection item actual information selected in accordance with the user setting information with the profile information corresponding to the print medium.

6. The image forming apparatus according to claim 4,
wherein priority information is set as a priority index for selecting the detection item actual information, and
in a case where the hardware processor determines whether there is the attribute information of the print medium including the detection item information matching the detection item actual information included in the actual attribute information of the print medium present in the image forming apparatus, the hardware processor selects the detection item actual information in accordance with the priority information.

7. The image forming apparatus according to claim 4,
wherein determination criterion information as an index of an allowable range for determining whether there is attribute information of the print medium including the detection item information matching the detection item actual information included in the actual attribute information of the print medium present in the image forming apparatus is set, and
when the hardware processor determines whether there is the attribute information of the print medium including the detection item information matching the detection item actual information included in the attribute information of the print medium, the hardware processor determines whether a difference between the detection item information and the detection item actual information satisfies the determination criterion information.

8. The image forming apparatus according to claim 1, wherein, in a case where automatic detection of profile information corresponding to the print medium is valid, the hardware processor determines whether the detection item information matches the detection item actual information.

9. The image forming apparatus according to claim 1, wherein the profile information corresponding to the print medium includes setting information for forming an image on the print medium.

10. The image forming apparatus according to claim 1, wherein the profile information corresponding to the print medium includes specifications and process conditions of the print medium.

11. The image forming apparatus according to claim 1, wherein the information apparatus sets the profile information based on one of the actual attribute information of the print medium present in the image forming apparatus detected by the medium detection sensor or the attribute information stored in the storage.

\* \* \* \* \*